United States Patent
Kurz et al.

(10) Patent No.: US 9,859,052 B2
(45) Date of Patent: Jan. 2, 2018

(54) WIRELESS CHARGING COIL

(71) Applicant: A.K. Stamping Company, Inc., Mountainside, NJ (US)

(72) Inventors: Arthur Kurz, New Vernon, NJ (US); Bernard Duetsch, Summit, NJ (US); Joshua Kurz, Jersey City, NJ (US)

(73) Assignee: A.K. Stamping Co., Inc., Mountainside, NJ (US)

( * ) Notice: Subject to any disclaimer, the term of this patent is extended or adjusted under 35 U.S.C. 154(b) by 0 days.

(21) Appl. No.: 14/470,381

(22) Filed: Aug. 27, 2014

(65) Prior Publication Data
US 2015/0145634 A1    May 28, 2015

Related U.S. Application Data

(60) Provisional application No. 61/908,573, filed on Nov. 25, 2013, provisional application No. 62/004,587, filed on May 29, 2014.

(51) Int. Cl.
*H01F 27/28* (2006.01)
*H01F 27/24* (2006.01)
(Continued)

(52) U.S. Cl.
CPC ......... *H01F 38/14* (2013.01); *H01F 27/2847* (2013.01); *H01F 27/2852* (2013.01);
(Continued)

(58) Field of Classification Search
CPC ...... H01F 38/14; H01F 41/04; H01F 27/2847; H01F 5/00; H01F 27/2852;
(Continued)

(56) References Cited

U.S. PATENT DOCUMENTS

| 3,214,315 A | 10/1965 | Hildebrand |
| 5,142,767 A | 9/1992 | Adams et al. |

(Continued)

FOREIGN PATENT DOCUMENTS

| CN | 102084440 A | 6/2011 |
| EP | 2645385 A2 | 10/2013 |

(Continued)

OTHER PUBLICATIONS

International Search Report of the International Searching Authority dated Feb. 26, 2015, issued in connection with International Application No. PCT/US14/67440 (3 pages).

(Continued)

*Primary Examiner* — Mangtin Lian
(74) *Attorney, Agent, or Firm* — McCarter & English, LLP

(57) ABSTRACT

A wireless charging coil is provided herein. The wireless charging coil comprising a first stamped coil having a first spiral trace, the first spiral trace defining a first space between windings, and a second stamped coil having a second spiral trace, the second spiral trace defining a second space between windings, wherein the first stamped coil and second stamped coil are planar to and interconnected with one another, such that the first stamped coil is positioned within the second space of the second stamped coil, and the second stamped coil is positioned within the first space of the first stamped coil.

9 Claims, 13 Drawing Sheets

(51) Int. Cl.
*H01F 38/14* (2006.01)
*H01F 41/04* (2006.01)
*H01F 27/36* (2006.01)
*H04B 5/00* (2006.01)

(52) U.S. Cl.
CPC ......... *H01F 27/2871* (2013.01); *H01F 41/04* (2013.01); *H01F 27/365* (2013.01); *H04B 5/0037* (2013.01); *Y10T 29/49073* (2015.01)

(58) Field of Classification Search
CPC .. H01F 27/2871; H01F 27/365; H02J 7/0042; H02J 7/025; H02J 5/005; H04B 5/0037; H04B 5/0087; Y10T 29/4902
USPC .................. 336/232, 147, 222, 200; 29/606
See application file for complete search history.

(56) References Cited

U.S. PATENT DOCUMENTS

| | | | |
|---|---|---|---|
| 5,831,348 | A | 11/1998 | Nishizawa |
| 6,180,433 | B1 | 1/2001 | Furey et al. |
| 8,674,692 | B2 | 3/2014 | Camp |
| 9,162,024 | B2 | 10/2015 | Pang et al. |
| 2004/0231138 | A1 | 11/2004 | Kasahara et al. |
| 2008/0048816 | A1* | 2/2008 | Matsumoto ............. H01F 19/04 336/200 |
| 2008/0164967 | A1 | 7/2008 | Mashino |
| 2011/0032065 | A1 | 2/2011 | Raczkowski |
| 2011/0050382 | A1* | 3/2011 | Baarman ................... H01F 1/26 336/221 |
| 2011/0102125 | A1 | 5/2011 | Tamura et al. |
| 2012/0068708 | A1 | 3/2012 | Camp |
| 2013/0015719 | A1* | 1/2013 | Jung .................... H04B 5/0037 307/104 |
| 2013/0120100 | A1 | 5/2013 | Muramatsu et al. |
| 2013/0181668 | A1* | 7/2013 | Tabata .................... H01F 38/14 320/108 |
| 2013/0187474 | A1* | 7/2013 | De Boodt ............... H02J 5/005 307/104 |
| 2013/0200974 | A1 | 8/2013 | Markowski et al. |
| 2013/0260677 | A1 | 10/2013 | Partovi |
| 2013/0307468 | A1 | 11/2013 | Lee et al. |
| 2014/0021794 | A1 | 1/2014 | Kim et al. |
| 2015/0145635 | A1 | 5/2015 | Kurz et al. |
| 2015/0244203 | A1 | 8/2015 | Kurz et al. |
| 2016/0163451 | A1* | 6/2016 | Wang .................... H01F 41/042 336/192 |

FOREIGN PATENT DOCUMENTS

| | | |
|---|---|---|
| GB | 2369251 | 3/2004 |
| TW | 201015592 A | 4/2010 |
| WO | 2013/046533 A1 | 4/2013 |

OTHER PUBLICATIONS

PCT Written Opinion of the International Searching Authority dated Feb. 26, 2015, issued in connection with International Application No. PCT/US14/67440 (5 pages).

International Search Report of the International Searching Authority dated Dec. 17, 2014, issued in connection with International Application No. PCT/US14/53151 (3 pages).

PCT Written Opinion of the International Searching Authority dated Dec. 17, 2014, issued in connection with International Application No. PCT/US14/53151 (5 pages).

Office Action dated Mar. 15, 2016, issued in connection with U.S. Appl. No. 14/553,617 (6 pages).

Notice of Allowance dated Jul. 5, 2016, issued in connection with U.S. Appl. No. 14/553,617 (7 pages).

Office Action dated Dec. 29, 2016, issued in connection with U.S. Appl. No. 14/705,398 (8 pages).

Office Action, along with its English translation, dated Apr. 25, 2017, issued by the State Intellectual Property Office of China in connection with Chinese Patent Application No. CN201480074077.1 (13 pages).

Extended European Search Report dated Jun. 7, 2017, issued by the European Patent Office in connection with European Patent Application No. EP14863209.4 (5 pages).

Office Action dated on Sep. 26, 2017, issued by the Taiwan Patent Office in connection with Taiwan Patent Application No. 103140754, along with English translation (9 pages).

Office Action, along with its English translation, dated on Nov. 6, 2017, issued by the Chinese Patent Office in connection with Chinese Patent Application No. 201480074077.1 (10 pages).

* cited by examiner

WIRELESS CHARGING COIL

CROSS-REFERENCE TO RELATED APPLICATIONS

This application claims priority to U.S. Provisional Patent Application No. 61/908,573 filed on Nov. 25, 2013, and U.S. Provisional Patent Application No. 62/004,587 filed on May 29, 2014, the entire disclosures of which are expressly incorporated herein by reference.

BACKGROUND

Field of the Disclosure

The present disclosure relates to a wireless charging coil and methods for manufacturing thereof. More specifically, the present disclosure relates to a bifilar parallel wound, series connected wireless charging coil.

Related Art

Wireless power transfer is the transfer of electrical power from a base station (transferring power) to a mobile device (consuming power) through electromagnetic induction (inductive power) and/or resonant frequency method. Wireless power transfer is becoming increasingly popular in mobile devices, and particularly in smartphones. A popular standard for inductive charging technology is the Qi interface standard developed by the Wireless Power Consortium, which has several protocols to allow the wireless transfer of electrical power between electronic devices. Other standards may make use of electromagnetic induction or resonant frequency to wirelessly charge devices. A mobile device (or any other electronic device) must meet certain requirements and performance standards in order to be Qi compliant.

Consumers generally want their mobile devices to be small and thin but also powerful and efficient, which are often counteracting goals. More specifically, charging coils must vary the material thickness to lower resistance and increase efficiency. Further, maximizing these goals can lead to performance and manufacturing limitations.

What would be desirable, but has not yet been developed, is a thinner and more efficient wireless charging coil for wireless power transfer between electronic devices.

SUMMARY

The present disclosure relates to wireless charging coils and methods for making thereof. More specifically, the present disclosure relates to a planar bifilar parallel-wound, series connected wireless charging coil. The coil has a thinner thickness (e.g., low profile), an increased density (e.g., high fill factor), and higher efficiency (e.g., lower resistance) than conventional wireless charging coils.

BRIEF DESCRIPTION OF THE DRAWINGS

The foregoing features of the disclosure will be apparent from the following Detailed Description, taken in connection with the accompanying drawings, in which.

DETAILED DESCRIPTION

The present disclosure relates to a wireless charging coil and methods of making same. As discussed in more detail below in connection with FIGS. 1-7, the stamped metal wireless charging coil comprises a series of parallel traces connected in a bifilar fashion. In other words, the wireless charging coil includes first and second coils that are parallel, closely spaced, and connected in series such that the first and second coils have parallel currents. The first and second coils could be stacked or planar and connected in series and/or parallel to meet performance requirements (e.g., electrical requirements, power requirements, etc.). The wireless charging coil could be used in any battery powered device, particularly in mobile devices (e.g., smartphones, tablets, watches, etc.). The wireless charging coil can be made to be Qi compliant, but could be adjusted to comply with any wireless transfer protocol. A wireless charging coil with a greater amount of conductive material, such as copper, can be positioned within a given space by varying (e.g., increasing) the thickness of the coil, which increases energy availability. Compared with other wireless charging coils, the wireless charging coils described herein exhibit an increased magnetic coupling effectiveness (e.g., magnetic field strength) and thereby transmit energy at a higher efficiency.

Figure 1:
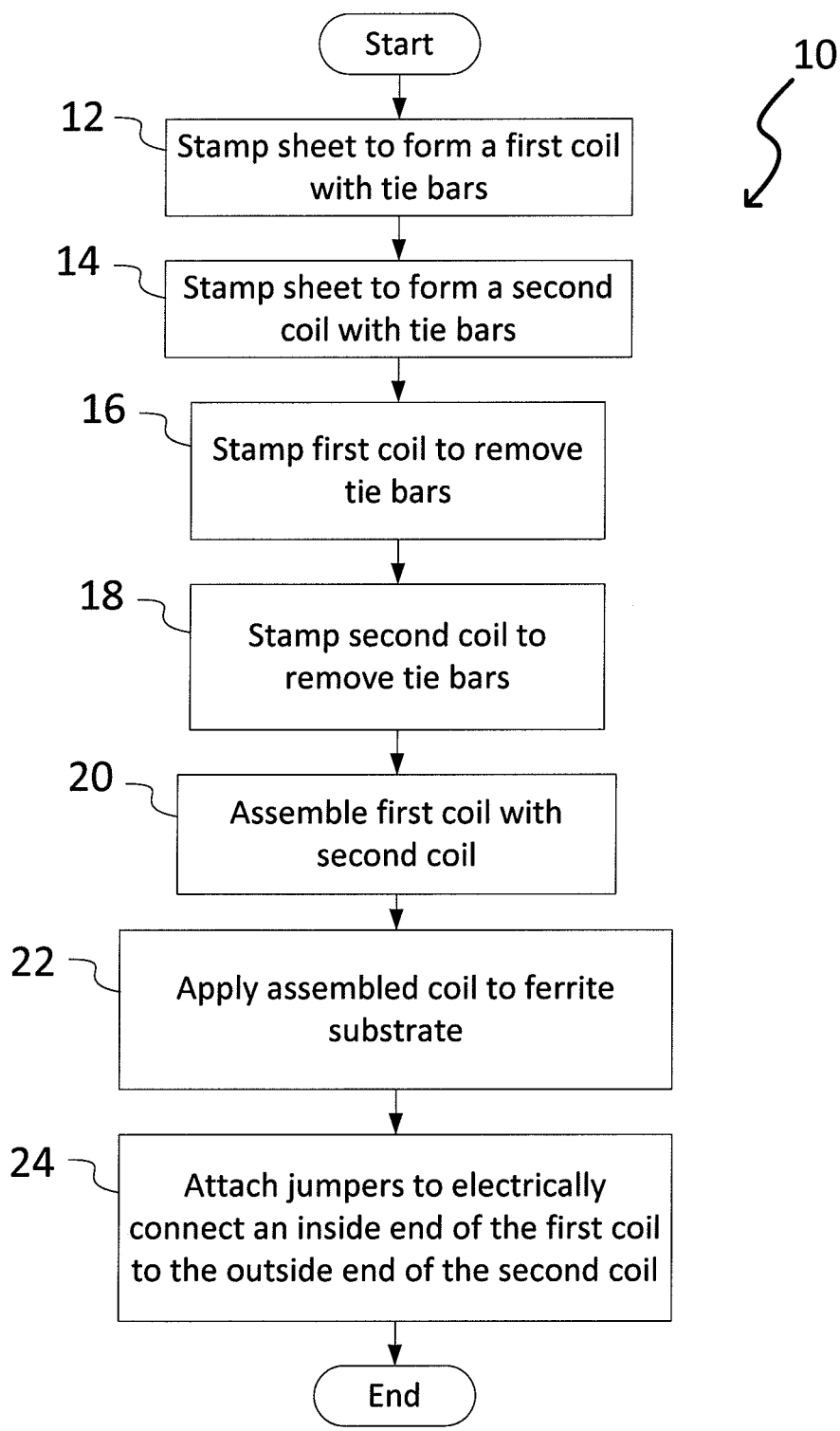
FIG. 1 is a diagram showing processing steps for manufacturing a wireless charging coil.

FIG. 1 is a diagram showing processing steps 10 for manufacturing a wireless charging coil of the present disclosure. In step 12, a metal sheet is stamped to form a first coil with tie bars. The metal sheet could be any of a variety of materials suitable for wireless power transfer (e.g., copper, copper alloy, aluminum, aluminum alloy, etc.). In step 14, a metal sheet (e.g., the same metal sheet or a different metal sheet) is stamped to form a second coil with tie bars. In step 16, the first coil is stamped to remove the tie bars. In step 18, the second coil is stamped to remove the tie bars. In step 20, the first and second coils are assembled together. In step 22, the assembled coil is applied to a ferrite substrate. In step 24, jumpers (e.g., leads) are attached to electrically connect the first and second coils in series (e.g., an inside end of the first coil is electrically connected to the outside end of the second coil via a jumper).

The steps described above could be interchanged, consolidated, or omitted completely. For example, the coils could be stamped without first forming tie bars, and/or the first and second coils could be applied directly to the ferrite (without being assembled first), etc. Additionally, the coil could be photo-chemically etched or machined instead of stamped, or made by any other suitable manufacturing process.

Figure 2:
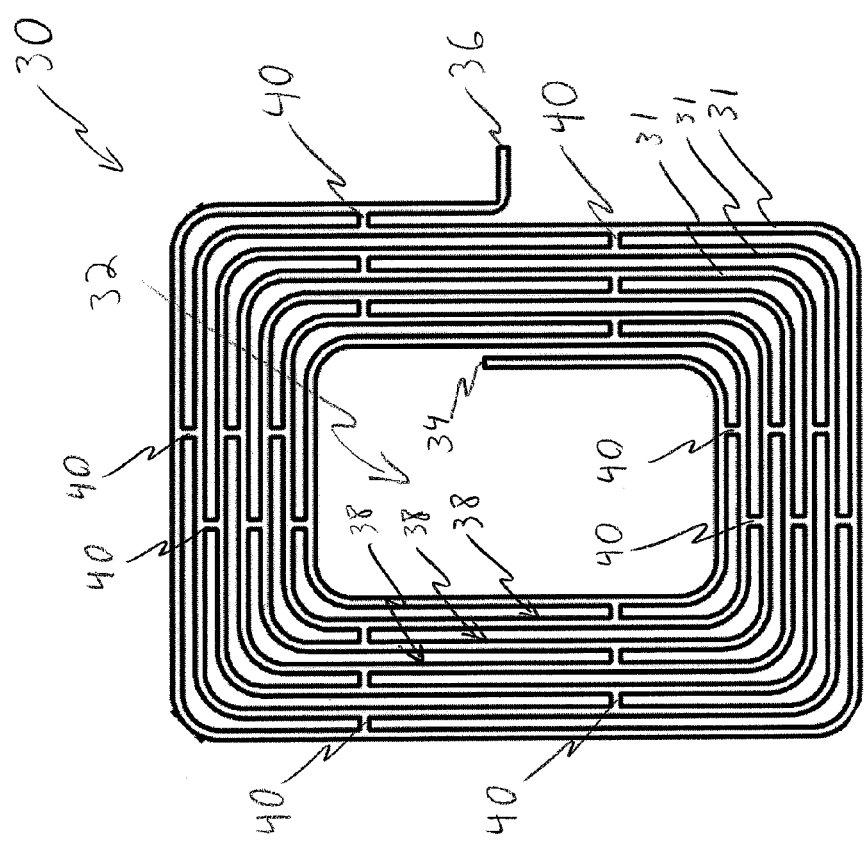
FIG. 2 is a schematic view of a first stamped coil with tie bars.

FIG. 2 is a view of a first stamped coil 30 with tie bars. The first coil 30 can be a generally rectangular planar spiral trace 31, although the trace 31 could form any suitable shape (e.g., circular planar spiral). The dimensions of the coil 30 could vary depending on the application of the coil 30 (e.g., as used in mobile devices, wearable devices, cars, etc.). The coil 30 could be of any suitable thickness, such as between 0.003 in. and 0.020 in., etc., but could be thicker for higher powered applications. The coil 30 could be of any suitable overall dimensions, such as between 0.25 in. and 4 in. in width and/or between 0.25 in. and 4 in. in height. The trace 31 could also be of any suitable dimensions. For example, the trace 31 could be between 0.005 in. and 0.250 in. in width. The dimensions could vary depending on physical and performance requirements of the mobile device (e.g., required frequency). The coil 30 could be made of any suitable material for wireless power transfer, such as, for example, copper, copper alloy, aluminum, aluminum alloy, tempered copper alloy (e.g., C110), etc.

The trace 31 of the coil 30 revolves around a center any number of times (e.g., 5, 10, etc.), such as to comply with any inductive or resonant power requirements. The trace 31 spirals to form an inside portion 32 at the center of the coil 30. As a result, the coil 30 has an inside end 34 and an outside end 36. The spaces 38 between the trace 31 are configured to be wide enough (e.g., 0.0285 in.) to accommodate the second stamped coil (described in more detail below). Tie bars 40 can be positioned at a plurality of locations throughout these spaces 38 to maintain the general shape of the coil 30 (e.g., prevent unwinding or deformation of the shape), such as during transportation of the coil 30 between locations or between stations. The outside end 36 could extend out at an angle, such as a generally ninety degree angle. The inside end 34 and outside end 36 can be disposed towards the same side of the coil 30, but could be at any of a variety of locations in the coil 30.

Figure 3:
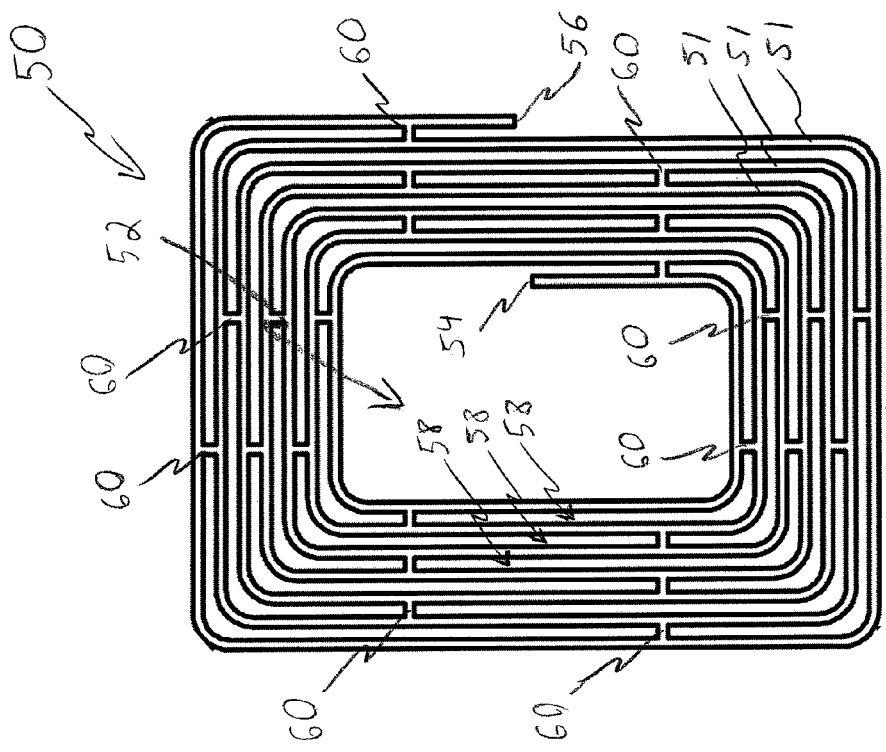
FIG. 3 is a schematic view of a second stamped coil with tie bars.

FIG. 3 is a view of a second stamped coil 50 with tie bars. The second coil 50 shares most of the same features and characteristics of the first coil shown in FIG. 2. The second coil 50 can be a generally rectangular planar spiral trace 51, although the trace 51 could form any suitable shape (e.g., circular planar spiral). The dimensions of the coil 50 could vary depending on the application of the coil 50 (e.g., as used in mobile devices, wearable devices, cars, etc.). The coil 50 could be of any suitable thickness, such as between 0.003 in. and 0.020 in., etc., but could be thicker for higher powered applications. The coil 50 could be of any suitable overall dimensions, such as between 0.25 in. and 4 in. in width and/or between 0.25 in. and 4 in. in height. The trace 51 could also be of any suitable dimensions. For example the trace 51 could be between 0.005 in. and 0.250 in. in width. The dimensions could vary depending on physical and performance requirements of the mobile device (e.g., required frequency). The coil 50 could be made of any suitable material for wireless power transfer, such as, for example, copper, copper alloy, aluminum, aluminum alloy, tempered copper alloy (e.g., C110), etc.

The trace 51 of the coil 50 revolves around a center any number of times (e.g., 5, 10, etc.), such as to comply with any inductive or resonant power requirements. The trace 51 spirals to form an inside portion 52 at the center of the coil 50. As a result, the coil 50 has an inside end 54 and an outside end 56. The spaces 58 between the trace 51 are configured to be wide enough (e.g., 0.0285 in.) to accommodate the first stamped coil 30 (described above). Tie bars 60 can be positioned at a plurality of locations throughout these spaces 58 to maintain the general shape of the coil 50 (e.g., prevent unwinding or deformation of the shape), such as during transportation of the coil 50 between locations or between stations. The outside end 56 does not extend out as with the first coil 30 (but could). The inside end 54 and outside end 56 can be disposed towards the same side of the coil 50, but could be at any of a variety of locations in the coil 50.

Figure 4:
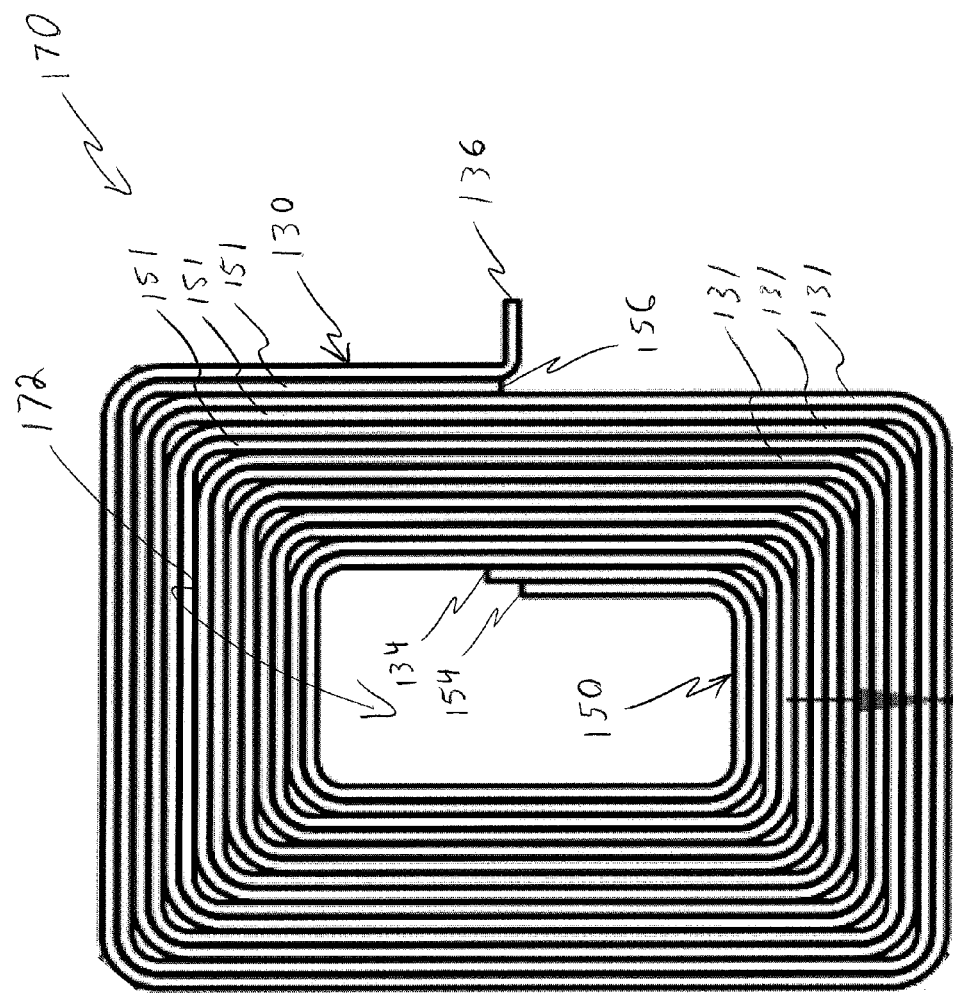
FIG. 4 is a schematic view of an assembled coil after the tie bars of the first and second stamped coils have been removed.

FIG. 4 is a view of an assembled coil 170 after the tie bars of the first and second stamped coils 130, 150 have been removed. As shown, the first and second coils 130, 150 fit into each other. More specifically, the first coil 130 fits into the space formed between the trace 151 of the second coil 150, and conversely, the second coil 150 fits into the space formed between the trace 131 of the first coil 130. However, when assembled, there are small gaps between the trace 131 of the first coil 130 and the trace 151 of the second coil 150 (e.g., 0.003 in., 0.004 in., etc.), as discussed below in more detail. As a result, together the first and second coils 130, 150 together form a parallel planar spiral. Also shown, the inside end 134 of the first coil 130 is adjacent to the inside end 154 of the second coil 150, and the outside end 136 of the first coil 130 is adjacent to the outside end 156 of the second coil 150. However, the ends could be any relative distance from one another. This stamping method could have an average space width variation of at least approximately 0.003 in. for the assembled coil 170. The maximum and minimum variance are dependent on the assembled coil 170 dimensions (e.g., overall height and width).

The tight tolerances and rectangular cross-sectional shape of the traces 130, 131 could result in a fill ratio (e.g., 85%) greater than current industry coils (e.g., 65%), such as wound coils, etched coils, etc. For example, the rectangular cross-sectional shape achieved from stamping (see FIG. 9 below) provides a potentially greater fill ratio than the circular cross-sectional shape of a round wire (e.g., round copper wire). More specifically, a 0.010 in. diameter insulated round wire (0.009 diameter in. wire with 0.0005 in. insulation) could provide a 65% fill ratio, compared to a stamped coil with a rectangular cross section having a 0.006 thickness and 0.003 spacing gap. Further, the wireless charging coil 170 can operate under higher ambient temperatures than other current industry wires (e.g., Litz wire), and is not susceptible to degradation by vibration, shock, or heat. This is partly because the wireless charging coil 170 is made of a single-monolithic conductor (e.g., not a multi-strand wire). This can be compared to the individual strands of a Litz wire, which has insulation material separating each of the individual wire strands which cannot withstand higher temperatures.

Figures 5, 6:
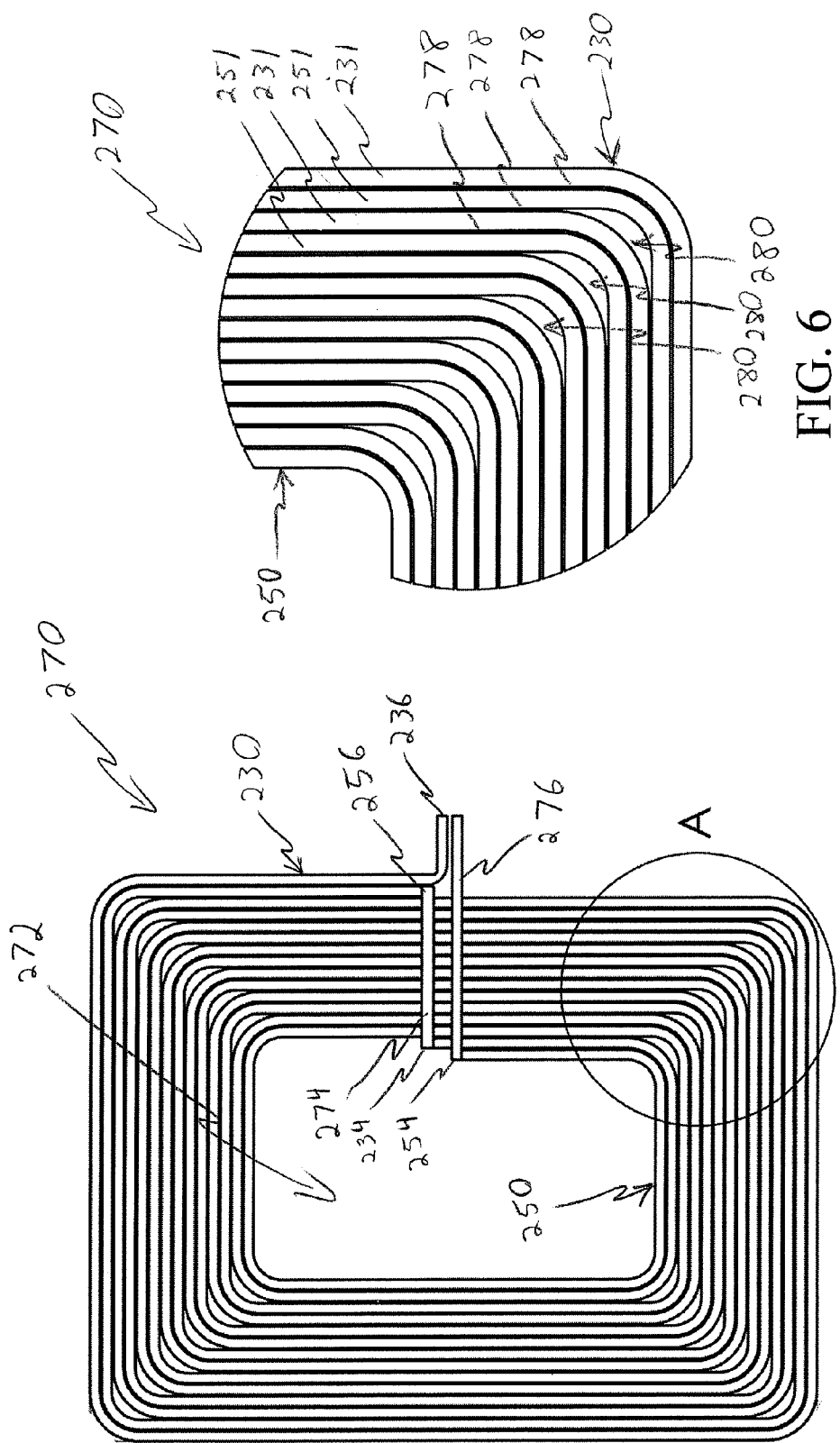
FIG. 5 is a schematic view of the assembled wireless charging coil with jumpers attached.
FIG. 6 is a close up view of portion A of FIG. 5.

FIG. 5 is a view of the assembled wireless charging coil 270 with jumpers attached. Although not shown, a jumper could be attached to the first outside end 236. As shown, the inside end 234 of the first coil 230 is electrically connected to the outside end 256 of the second coil 250 by a first jumper 274. These ends 234, 256 are relatively proximate to one another, and disposed on the same side of the coil 270 to allow for a short jumper 274. A second jumper 276 then used to electrically connect the inside end 254 of the second coil with the mobile device circuitry. The outside end 236 and inside end 254 are relatively proximate and disposed towards the same side of the coil 270, to provide for a short jumper 276 and for ease of electrical wiring with the electronic device. The result is a pair of parallel, closely spaced coils 230, 250 connected in series such that the first and second traces 230, 250 have parallel currents (e.g., the currents of each trace are in the same clockwise or counter-clockwise direction).

When fully assembled with the other components of the electronic device, the inside portion 272 of the assembled coil 270 is insulated (e.g., by plastic and glue) to ensure proper performance. The assembled wireless charging coil 270 can have any number of windings, depending upon electrical requirements. The wireless charging coil 270 could be used in any battery powered device, such as smartphones. The assembled coil 270 could be of any suitable overall dimensions (e.g., 1.142 in. width and 1.457 in. height, etc.). The coil length could be of any suitable length (e.g., 48.459 in.).

FIG. 6 is a close up view of portion A of FIG. 5. As shown, there are very small gaps 278 (e.g., voids) between the trace 231 of the first coil 230 and the trace 251 of the second coil 250 (e.g., 0.003 in., 0.004 in., etc.), although there could be increased gaps 280 at the corners to account for the bends in the traces 231, 251 (e.g., such that the gap increase alternates). These tight tolerances could result in a fill ratio greater than current industry methods.

The assembled wireless charging coil 270 could provide direct current (DC) resistance (ohms), alternating current (AC) resistance, and/or AC/DC resistance ratios at a number of different values depending on the dimensions of the charging coil 270 and material(s) used in construction of the charging coil. The values could be adjusted to achieve high AC/DC ratios to meet induction standards. The coil dimensions could be varied to achieve varying resistance depending on the performance characteristics required. For example, for a resistance of 0.232 ohms using C110 alloy, the traces 230, 250 could have a cross section of 0.0001234 in.$^2$ (e.g., 0.005 in. thickness and 0.0246 in. width, or 0.004 in. thickness and 0.0308 in. width, etc.), and for a resistance of 0.300 ohms using C110 alloy, the traces 230, 250 could have a cross section of 0.0000953 in.$^2$ (e.g., 0.005 in. thickness and 0.019 in. width, or 0.004 in. thickness and 0.0238 in. width, etc.). The stamped wireless charging coil 270 can achieve a high trace thickness and/or high overall aspect ratio compared to other current industry methods (e.g., printed circuit board (PCB) etched coils).

Figure 7:
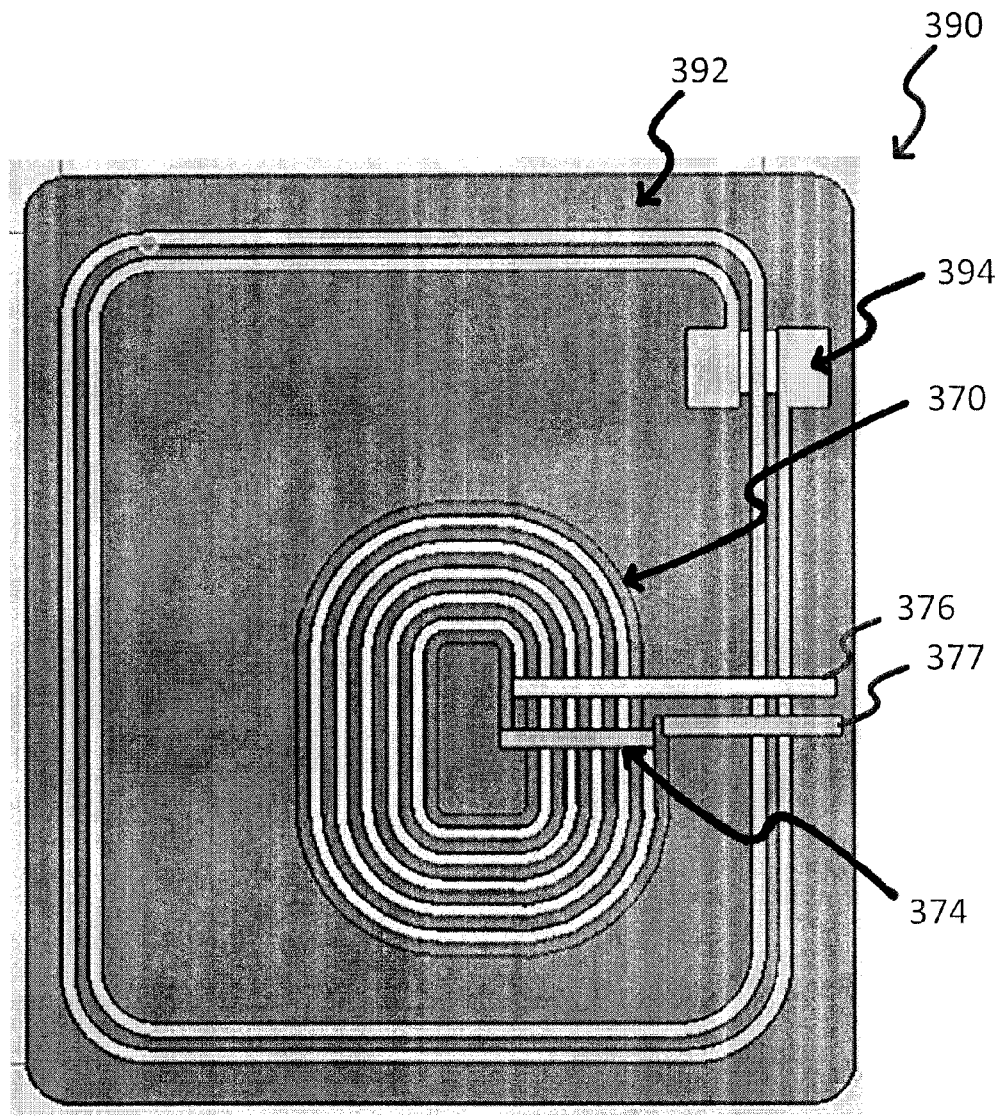
FIG. 7 is a schematic view of an electrical component assembly including a wireless charging coil and NFC antenna.

FIG. 7 is a view of an electrical component assembly 390 including a wireless charging coil 370. More specifically, the wireless charging coil 370 is attached to ferrite substrate 392 and in conjunction with a near field communication (NFC) antenna 394 having contact paddles. The wireless charging coil 370 and NFC antenna 394 could have contact pads (e.g., gold) to connect the wireless charging coil 370 and NFC antenna 394 to the circuitry of the mobile device. The assembly comprises a first jumper 374, a second jumper 376, and a third jumper 377 connecting the various ends of the coil 370, as explained above in more detail. There could be a film (e.g., clear plastic) over the wireless charging coil 370 and NFC antenna 394, with the jumpers 374, 376, 377 on top of the film and only going through the film at the points of connection. This prevents accidentally shorting any of the electrical connections of the coil 370. Alternatively, the jumpers 374, 376, 377 could be insulated so that a film is not needed. To minimize space, the wireless charging coil 370 is within the NFC antenna 394 with jumpers 376, 377 that extend to the outside of the NFC antenna 394. However, the wireless charging coil 370 and jumpers 376, 377 could be placed at any location relative to the NFC antenna 394.

The total thickness of the assembly could vary depending on various potential needs and requirements. For example, the jumpers could be 0.05-0.08 mm thick, the film could be 0.03 mm thick, the NFC antenna 394 and coil 370 could be 0.08 mm thick, and the ferrite 392 could be 0.2 mm thick for a total wireless charging coil thickness of approximately 0.36 mm.

Figure 8:
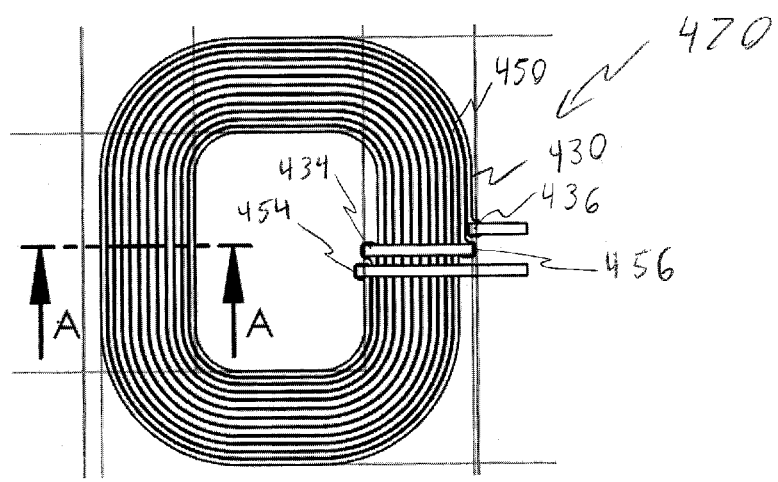
FIG. 8 is a schematic view of an assembled wireless charging coil with planar bifilar coils.

FIG. 8 is a schematic view of an assembled wireless charging coil 470 with planar bifilar coils. As discussed above, the wireless charging coil 470 includes a first coil 430 (e.g., trace) and a second coil 450 (e.g., trace). The assembled coil 470 is manufactured and operates in the manner discussed above with respect to FIGS. 1-7. The first coil 430 and the second coil 450 can have any desired thickness, such as to meet different power requirements. The first coil 430 and second coil 450 could be connected in series or parallel.

The width of the first and/or second coil 430, 450 could vary along the length of the coil to optimize performance of the assembled wireless charging coil 470. Similarly, the thickness of the first and second coils 430, 450 could change over the length of the coil. For example, the width (and/or thickness) of the first coil 430 could gradually increase (or narrow) from a first end 434 towards a middle of the coil 430, and the width (and/or thickness) could likewise gradually narrow (or increase) from the middle to the second end 436 of the coil 430 (e.g., a spiral coil of wide-narrow-wide), thereby varying the cross-sectional area throughout. Any variation of width (e.g., cross-section) or thickness could be used, and/or these dimensions could be maintained constant over portions of the coil, according to desired performance characteristics.

Additionally (or alternatively), the spaces between the windings of the coil could be varied to optimize performance of the wireless charging coil 470. For example, the gap width between the traces could be wider towards the outside of the first coil 430 and narrower towards the inside of the first coil 430 (or the opposite). Similarly, the distance between the first coil 430 and second coil 450 in the assembled coil 470 could also be varied to optimize performance. Further, the geometry of the edges of the coil could be varied (e.g., scalloped, castellated, etc.), such as to reduce eddy currents.

Figure 9:
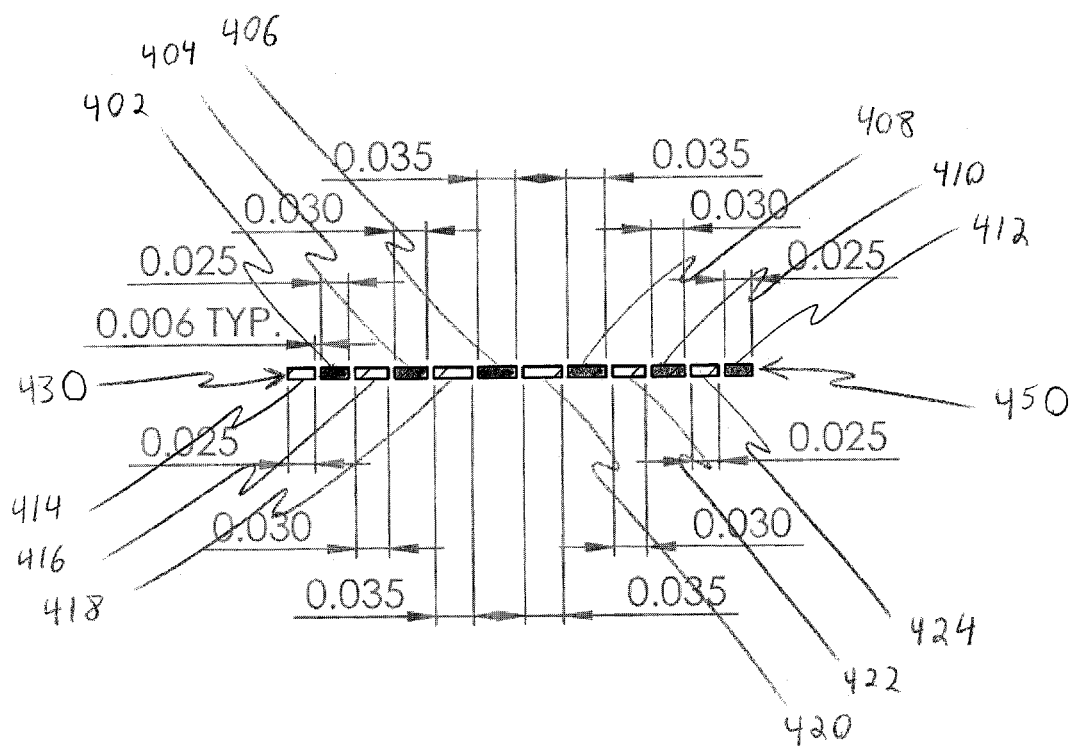
FIG. 9 is a cross-sectional view of a portion of the wireless charging coil of FIG. 8.

FIG. 9 is a cross-sectional view of a portion of the wireless charging coil of FIG. 8. The first coil 430 comprises sections 414-424 and the second coil 450 comprises sections 402-412. As shown, the cross-section of the first coil 430 becomes gradually wider and then narrower from a first end to a second end of the first coil 430. As a result, sections 414 and 424 are the narrowest (e.g., 0.025 in.), followed by sections 404 and 422 (e.g., 0.030 in.), and sections 418 and 420 are the widest (e.g., 0.035 in.). In the same way, the cross-section of the second coil 450 becomes gradually wider and then narrower from a first end to a second end of the second coil 450. As a result, sections 402 and 412 are the narrowest, and sections 406 and 408 are the widest. Changes in the dimensions of the cross section of the antenna can likewise be varied in other manners.

Figure 10:
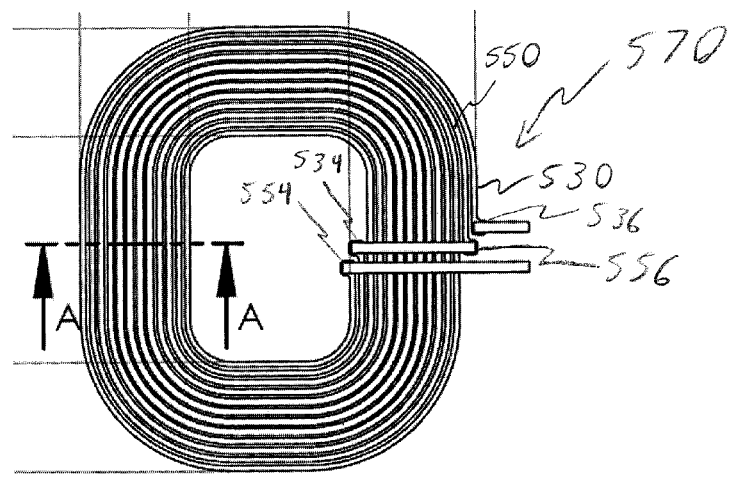
FIG. 10 is a schematic view of an assembled wireless charging coil with stacked bifilar coils.

FIG. 10 is a schematic view of an assembled wireless charging coil 570 with stacked bifilar coils. As discussed above, the wireless charging coil 570 includes a first coil 530 and a second coil 550. The assembled coil 570 is manufactured and operates in the manner discussed above with respect to FIGS. 1-7, as well as that discussed in FIGS. 8-9, except that the first and second coils 530, 550 are stacked instead of planar. The first coil 530 includes a first end 534 and a second end 536, and the second coil 550 includes a first end 554 and a second end 556. Further, varying the skew or offset (e.g., stacking distance) of the first coil 530 relative to the second coil 550 can affect the performance of the wireless charging coil 570. The first coil 530 and second coil 550 could be connected in series or parallel.

Figure 11:
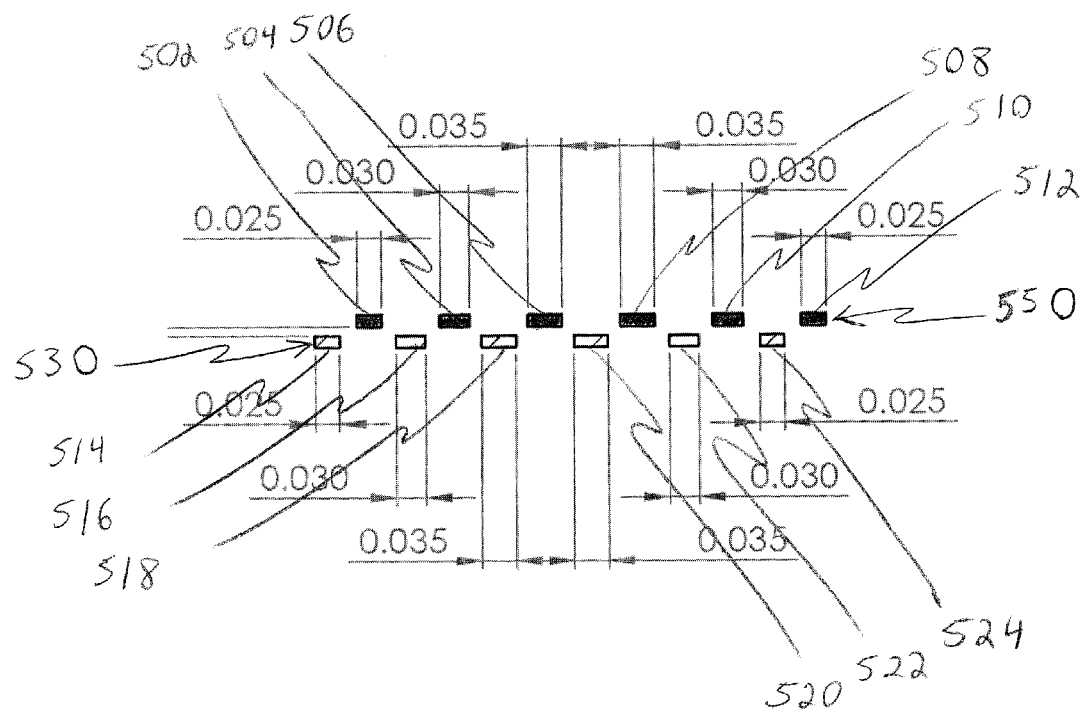
FIG. 11 is a cross-sectional view of a portion of the wireless charging coil of FIG. 10.

FIG. 11 is a cross-sectional view of a portion of the wireless charging coil of FIG. 10. This coil 570 is similar to that of FIGS. 8-9, including a first coil 530 with sections 514-524 and a second coil 550 with sections 502-512, except that the first and second coils 530, 550 are stacked instead of planar.

Figure 12:
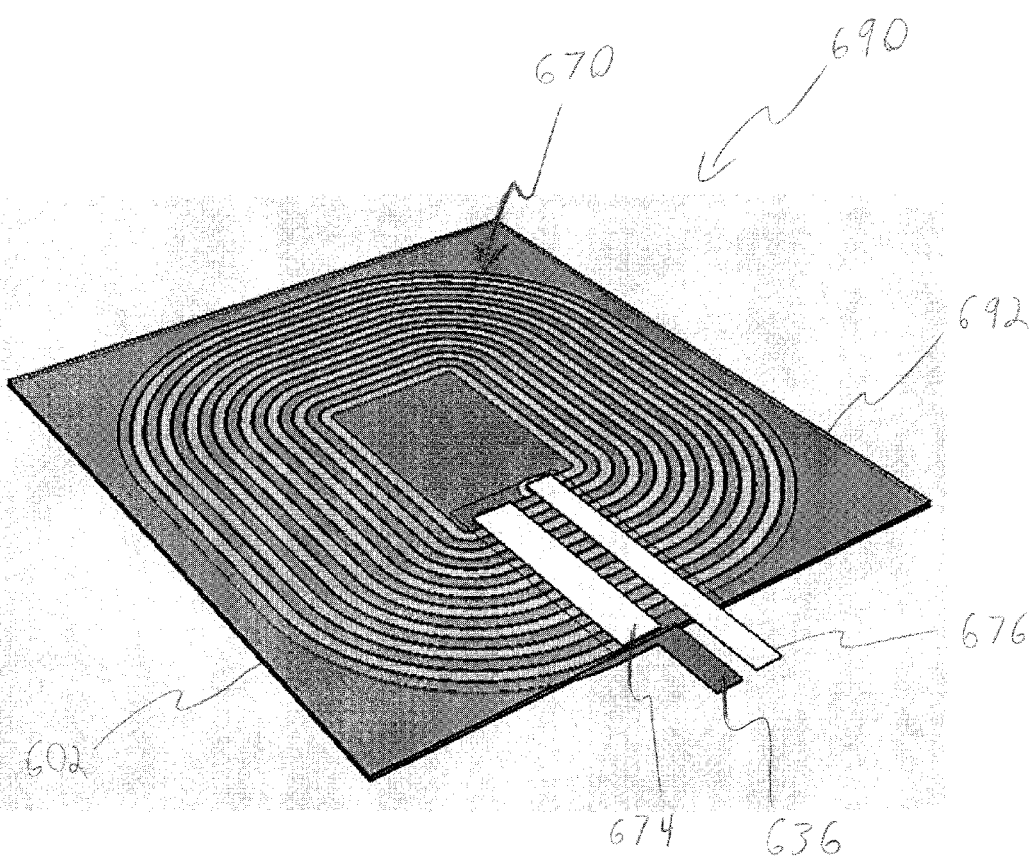
FIG. 12 is a perspective view of an electrical component assembly.
Figure 13:
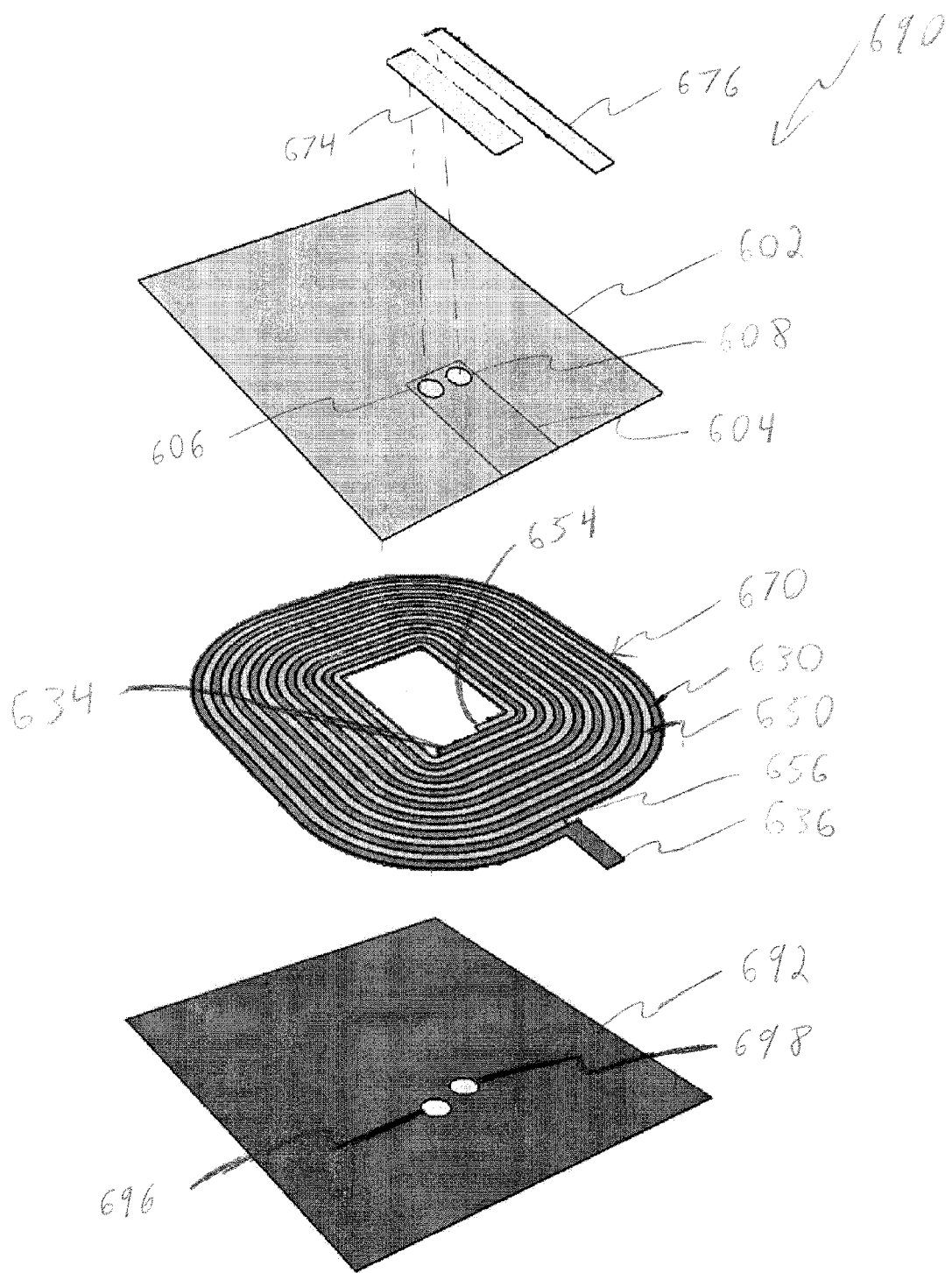
FIG. 13 is an exploded view of the electrical component assembly of FIG. 12

FIGS. 12-13 are views showing an electrical component assembly 690. More specifically, FIG. 12 is a perspective view of an electrical component assembly 690. The electrical component assembly 690 comprises a ferrite shield 692, a pressure sensitive adhesive (PSA) layer 602 positioned on the ferrite shield 692, an assembled coil 670 (e.g., bifilar coil) positioned therebetween, and jumpers 674, 676 positioned on the PSA layer 602.

FIG. 13 is an exploded view of the electrical component assembly 690 of FIG. 12. The bifilar coil 670 includes a first coil 630 having an inside end 634 and an outside end 636 interconnected with a second coil 650 having an inside end 654 and an outside end 656. The inside and outside ends are on the same side of the assembled coil 670 for ease of use and assembly (e.g., minimize the distance to electrically connect the ends).

Ferrite shield 692 includes a first hole 696 and a second hole 698 positioned to correlate with the placement of the inside end 634 of the first coil 630 and the inside end 654 of the second coil 650 (e.g., when the coil 670 is placed onto the ferrite shield 692. Although holes 696, 698 are shown as circular, any shape and size openings could be used (e.g., one rectangular opening, etc.). These holes 696, 698 facilitate assembly and welding of the electrical component assembly 690.

PSA layer 602 and ferrite shield 692 are similarly sized to one another, and although shown as rectangular, both could be of any shape (e.g., circular). PSA layer secures the relative placement of the assembled coil 670 to the ferrite shield 692. PSA layer 602 could have adhesive on one or both sides, and could include a polyethylene terephthalate (PET) film area 604 free of adhesive on one or both sides. PET film area 604 facilitates assembly and welding of the electrical component assembly 690

PSA layer 602 includes a first hole 606 and a second hole 608 in the PET film area 604 which correlate in position with the placement of the inside end 634 of the first coil 630 and the inside end 654 of the second coil 650 (as well as the first hole 696 and second hole 698 of the ferrite substrate 692). Although holes 606, 608 are shown as circular, any shape and size openings could be used (e.g., one rectangular opening). Holes 606, 608 provide access through the PSA layer 602 to electrically connect jumpers 674, 676 with the inside ends 634, 654 of the assembled coil 670. The PET film area 604 facilitates attachment of the jumpers 674, 676 to the assembly 690.

Figure 14:
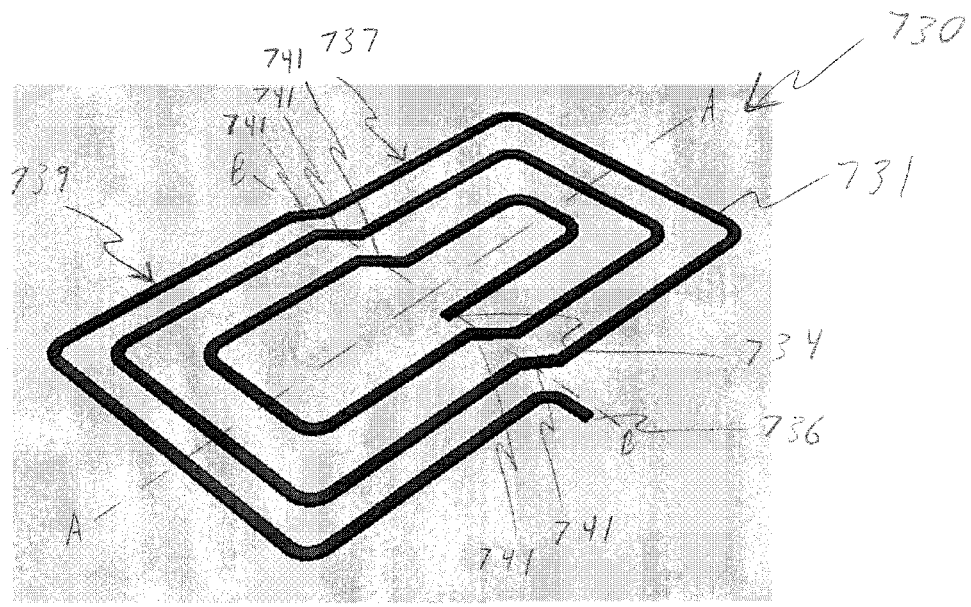
FIG. 14 is a perspective view of a resonant coil.

FIG. 14 is a perspective view of a resonant coil 730. Resonant coil 730 could be a generally rectangular planar spiral trace 731, although the trace 731 could form any suitable shape. The resonant coil 730 includes an inside end 734 and an outside end 736. The trace 731 is stamped on a strip or sheet of metal (e.g., copper, aluminum, etc.). The dimensions of the coil 730 could vary depending on the application of the coil 730. The coil 730 could be of any suitable thickness, and of any suitable overall dimensions. The trace 731 could also be of any suitable dimensions. The dimensions could vary depending on physical and performance requirements. The coil 730 could be made of any suitable material for wireless power transfer, such as, for example, copper, copper alloy, aluminum, aluminum alloy, tempered copper alloy (e.g., C110), etc. The gaps between the windings of the trace 731 are larger for a resonant coil than for other types of inductive coils due to performance requirements.

Stamping provides a scalable process for high volume production with high yields. The stamped trace 731 is not prone to unwinding and can allow for a thicker trace. This is advantageous compared with other existing technologies. For example, winding wire (e.g., copper) to a specific pattern on a surface is difficult and the wound wire can unwind. Further, etched copper is expensive and could be limited to a maximum thickness (e.g., 0.004 in. thick).

The trace 731 of the resonant coil 730 includes a first side 737 and a second side 739 offset from the first side 737 by angled portions 741 of the trace 731. The angled portions 741 are aligned with one another (e.g., occur along line B-B), and angled in the same direction. In other words, angled portions 741 are all angled toward a particular side of the coil 730 (e.g., towards one side of line A-A), such that a first portion 737 (e.g., upper portion) of the coil 730 is shifted relative to a second portion 739 (e.g., lower portion) of the coil 730.

Figure 15:
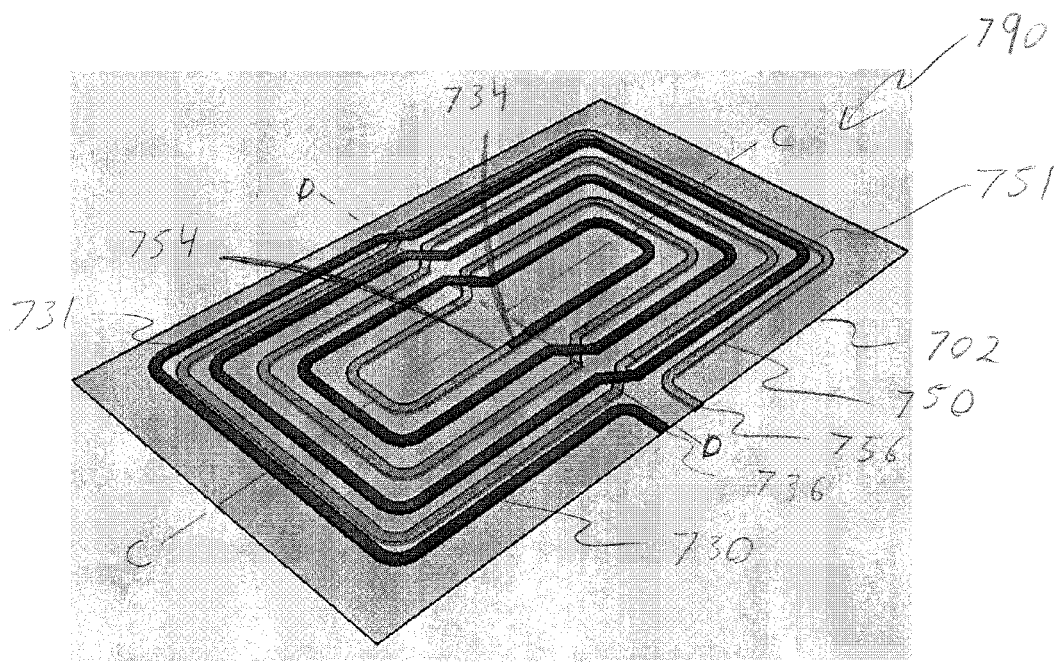
FIG. 15 is a perspective view of a resonant coil assembly.

FIG. 15 is a perspective view of a resonant coil assembly 790, including the first resonant coil 730 from FIG. 14. The resonant coil assembly 790 includes a first coil 730 and a second coil 750, which are identical to one another (which minimizes manufacturing costs). The resonant coil assembly 790 could be laminated such that the first coil 730 and second coil 750 are laminated to a film 702 (e.g., PET film), such as by an adhesive (e.g., heat activated, pressure sensitive, etc.) to provide more stability in downstream operations. The first coil 730 could be adhered to one side of the film 702 and the second coil 750 could be adhered to the opposite side of the film 702.

The first coil 730 includes an outside end 736 and an inside end 734, and the second coil 750 includes an outside end 756 and an inside end 754. The first coil 730 and second coil 750 could be exactly the same size and shape coil, except that the second coil 750 is rotated 180 degrees about line D-D. In this way, the trace 731 of the first coil 730 is positioned between the gap formed by the windings of the trace 751 of the second coil 750 (and vice-versa), except at the angled portions of each coil along line D-D, where the traces cross one another. The inside end 734 of the first coil 730 could be adjacent to (and in electrical connection with) the inside end 754 of the second coil 750, and the outside end 736 of the first coil 730 could be adjacent to the outside end 756 of the second coil 750.

Figure 16:
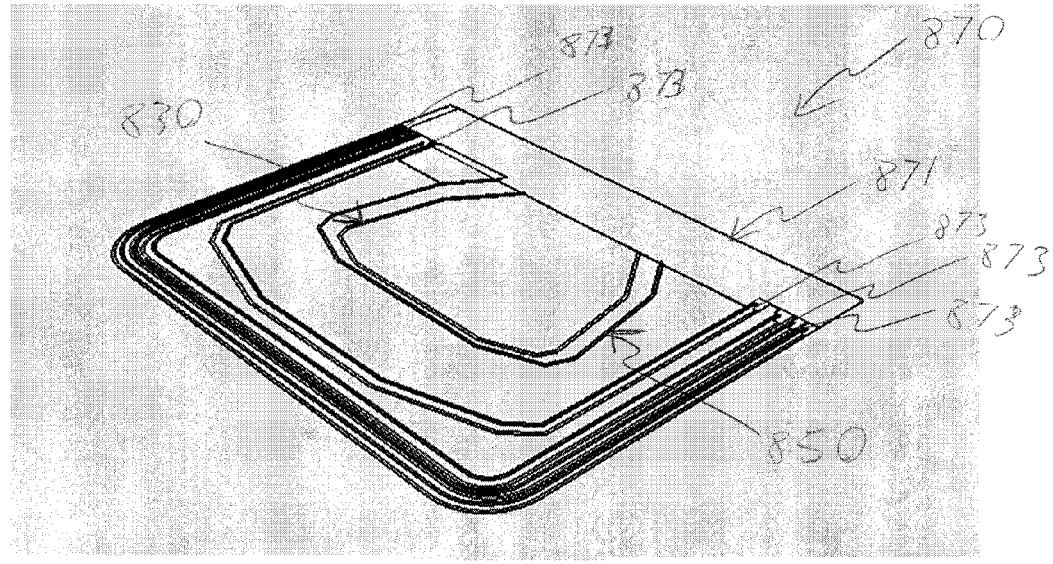
FIG. 16 is a perspective view of a folded stamped resonant coil.
Figure 17:
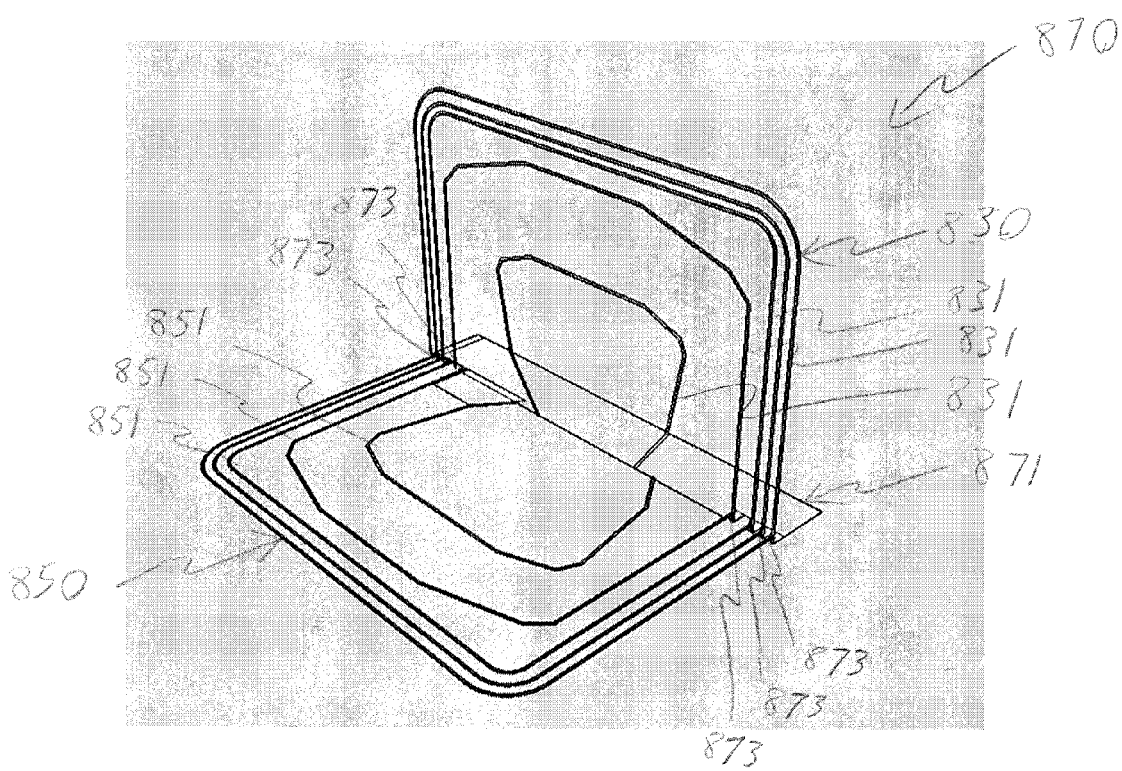
FIG. 17 is a perspective view of the coil of FIG. 16 partially opened.
Figure 18:
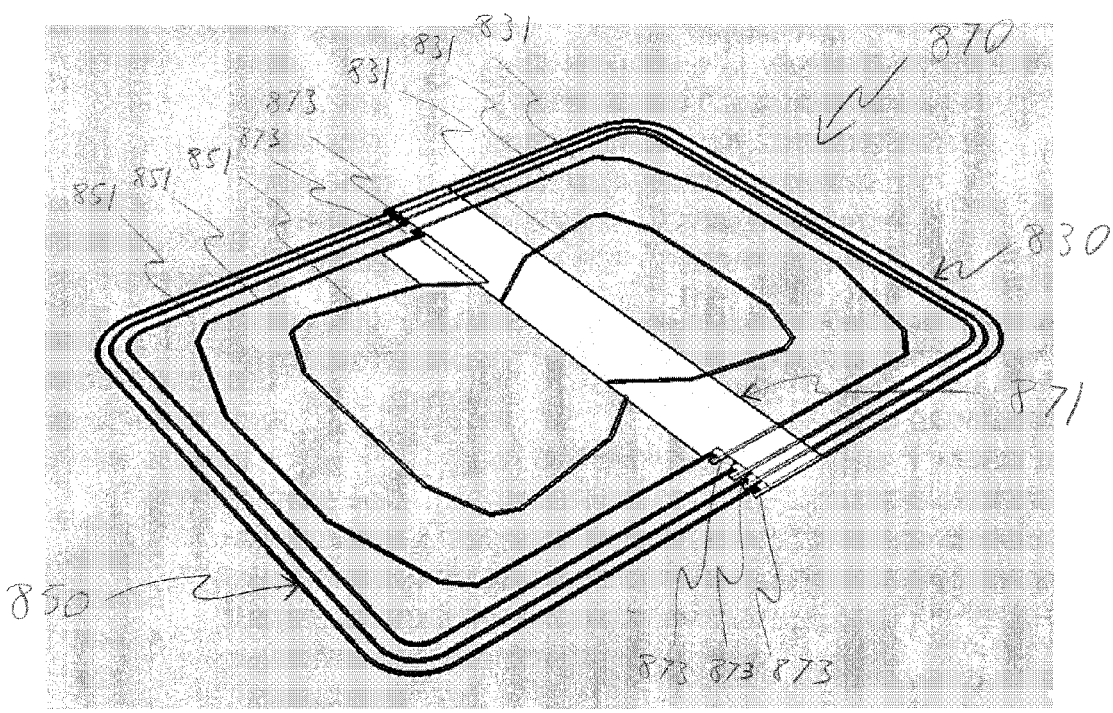
FIG. 18 is a perspective view of the coil of FIG. 16 fully opened.

FIGS. 16-18 are views of a stamped resonant coil 870. FIG. 16 is a perspective view of a folded stamped resonant coil 870. The coil 870 comprises connector sheet 871, a first set of traces 831 of a first coil portion 830 with ends thereof connected to an edge of the connector sheet 871 at connection points 873, and a second set of traces 851 of a second coil portion 850 with ends thereof connected to the same edge of the connector sheet 871 at connection points 873. To create the stamped resonant coil 870, a (single) sheet of metal is stamped to form the first set of traces 831 and the second set of traces 851 (e.g., such that the arcs of each trace of the first and second sets of traces 831, 851 are oriented in the same direction). The ends of the first and second set of traces 831, 851 are then connected to the same edge of connector sheet 871 (e.g., insulation material). The connector sheet 871 facilitates wiring of the sets of traces 831, 851 to each other, as well as facilitates the connection of the stamped resonant coil 870 to electronic circuitry. The ends of the first and second set of traces 831, 851 are then wired to each other, such as by using a series of jumpers and/or traces. For example, the jumpers and/or traces could be in the connector sheet 871 and could run parallel to the connector sheet (and perpendicular to the first and second sets of traces 831, 851).

FIG. 17 is a perspective view of the coil 870 of FIG. 16 partially opened. As shown, the first set of traces 831 of the first coil portion 830 are bent at connection points 873. FIG. 18 is a perspective view of the coil 870 of FIG. 16 fully opened. As shown, the first set of traces 831 of the first coil portion 830 continue to be bent at connection points 873 until the first coil portion 830 is planar with the second coil portion 850. Bending of the traces could result in fracturing on the outside surface thereof, in which case, ultrasonic welding could be used to ensure electrical conductivity. Alternatively, the first and second sets of traces 831, 851 could connect to opposing edges of the connector sheet 871, such that bending could not be required. Stamping (and bending) in this way reduces the amount of scrap generated, thereby increasing material utilization.

Figure 19:
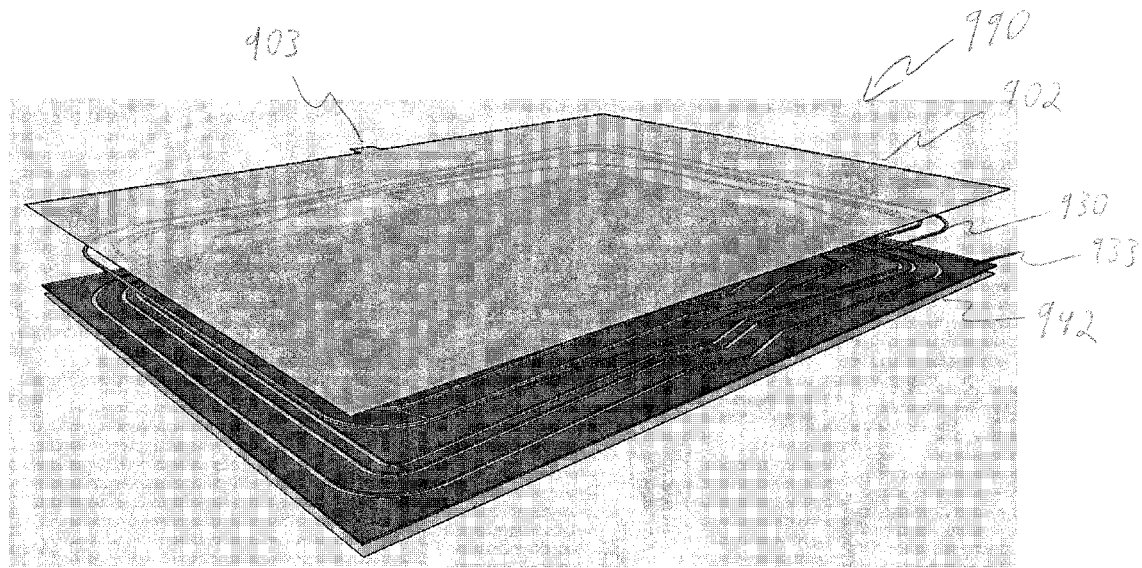
FIG. 19 is an exploded view of a low profile electrical component assembly.

FIG. 19 is an exploded view of a low profile electrical component assembly 990. More specifically, the low profile electrical component assembly 990 comprises a substrate 992 (e.g., PET layer), a filler material layer 933 (e.g., rubber, foam, durometer, etc.), a coil 930 (e.g., resonant coil), and a protective layer 902. The protective layer 902 could be partly translucent and could comprise a tab (e.g., for applying or removing).

Figure 20:
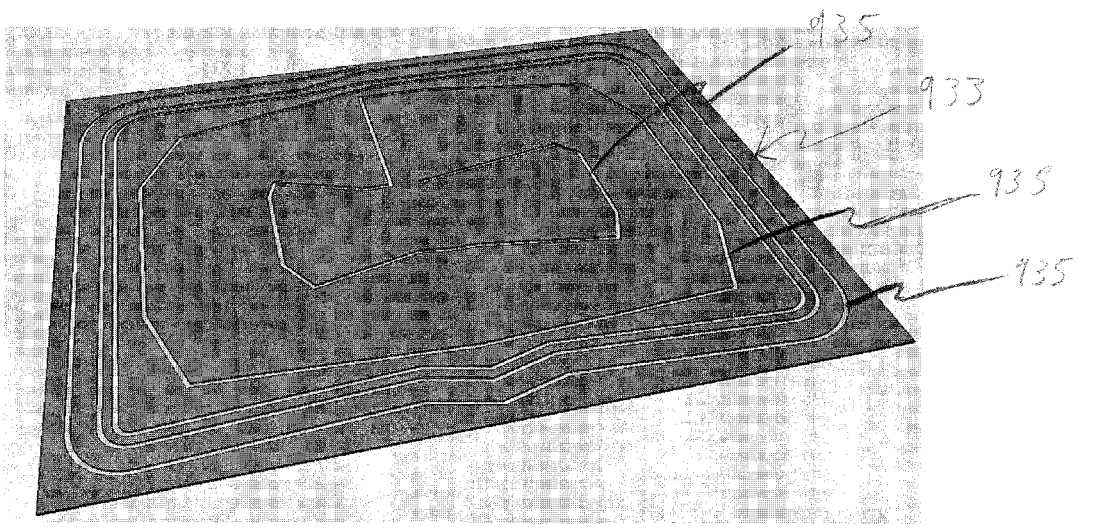
FIG. 20 is a perspective view of the filler material of FIG. 19.

FIG. 20 is a perspective view of the filler material 933 of FIG. 19. Filler material 933 comprises grooves 935 which correspond in size and shape to that of the coil 930. In this way, the coil 930 is nested in filler material 933, which protects the coil shape from bending and/or deformation. Such an assembly facilitates handling of the coil 930 for subsequent operations.

For any of the embodiments discussed above, the wireless charging coil (e.g., bifilar coil) could be constructed and then (e.g., at a different location and/or time) the first and second coils of the wireless charging coil, whether stacked or planar, could be electrically connected to each other in series or parallel depending on electrical requirements.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A wireless charging coil comprising:
   a first stamped coil having a first spiral trace with a rectangular cross-section, the first spiral trace defining a first space between windings, the first spiral trace having a width that varies along a length of the first stamped coil; and
   a second stamped coil having a second spiral trace with a rectangular cross-section, the second spiral trace defining a second space between windings, the second spiral trace having a width that varies along a length of the second stamped coil,
   the first stamped coil and second stamped coil positioned in the same plane and interconnected with one another, the first stamped coil positioned within the second space of the second stamped coil, and the second stamped coil positioned within the first space of the first stamped coil, when assembled the first spiral trace and the second spiral trace have a fill ratio greater than 65%.

2. The bifilar wireless charging coil of claim 1, wherein the first stamped coil and second stamped coil are connected in series.

3. The bifilar wireless charging coil of claim 1, wherein the first stamped coil and second stamped coil are of a generally rectangular shape.

4. The bifilar wireless charging coil of claim 1, wherein the first stamped coil includes an inside end and an outside end, the inside end disposed on the same side of the first stamped coil as the outside end.

5. The bifilar wireless charging coil of claim 1, wherein the first and second traces have a thickness between 0.003 inches and 0.020 inches.

6. The bifilar wireless charging coil of claim 1, wherein the first and second traces have a width between 0.005 inches and 0.250 inches.

7. The bifilar wireless charging coil of claim 1, wherein the first and second coils each include an inside end and an outside end, the inside end of the first coil disposed on a same side of the wireless charging coil as the outside end of the second coil, and further comprising a jumper electrically connecting the inside end of the first coil with the outside end of the second coil.

8. The bifilar wireless charging coil of claim 1, further comprising a ferrite substrate, the first and second coils applied to the ferrite substrate.

9. The bifilar wireless charging coil of claim 1, wherein the fill ratio is approximately 85%.

* * * * *